(12) United States Patent
Fiorenza et al.

(10) Patent No.: US 7,264,069 B2
(45) Date of Patent: Sep. 4, 2007

(54) VEHICLE OR LAWN AND GARDEN MAINTENANCE EQUIPMENT HAVING A GENERATOR, AND POWER TAKEOFF ASSEMBLY FOR A VEHICLE OR LAWN AND GARDEN MAINTENANCE EQUIPMENT

(75) Inventors: John Fiorenza, Slinger, WI (US); David Rose, New Berlin, WI (US); Tim Vetta, Milwaukee, WI (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 393 days.

(21) Appl. No.: 10/963,173

(22) Filed: Oct. 11, 2004

(65) Prior Publication Data

US 2006/0076172 A1    Apr. 13, 2006

(51) Int. Cl.
*A01D 34/03*    (2006.01)
*A01D 34/43*    (2006.01)
*A01D 34/64*    (2006.01)

(52) U.S. Cl. .................. 180/54.1; 180/53.7; 56/10.6
(58) Field of Classification Search .......... 180/53.1, 180/53.6, 53.7, 53.8, 65.1, 65.4, 900, 908, 180/54.1; 56/10.1, 10.6; 290/40 C
See application file for complete search history.

(56) References Cited

U.S. PATENT DOCUMENTS

| | | | |
|---|---|---|---|
| 4,203,710 A | 5/1980 | Farr | |
| 4,539,483 A | 9/1985 | Freeny, Jr. | |
| 4,692,680 A | 9/1987 | Sherer | |
| 4,862,981 A * | 9/1989 | Fujikawa et al. | 180/68.4 |
| 5,512,387 A | 4/1996 | Ovshinsky | |
| 5,965,999 A | 10/1999 | Frank | |
| 6,133,659 A | 10/2000 | Rao | |
| 6,359,344 B1 | 3/2002 | Klein et al. | |
| 6,579,137 B2 | 6/2003 | Mabru | |
| 6,591,593 B1 * | 7/2003 | Brandon et al. | 56/10.6 |
| 6,603,227 B2 | 8/2003 | Rose, Sr. | |
| 6,604,348 B2 * | 8/2003 | Hunt | 56/10.6 |
| 6,644,264 B2 | 11/2003 | Shoemaker | |
| 6,661,107 B2 | 12/2003 | Higuchi et al. | |
| 6,902,017 B2 * | 6/2005 | Ohashi | 180/53.6 |
| 6,948,299 B2 * | 9/2005 | Osborne | 56/10.8 |
| 2002/0149203 A1 | 10/2002 | Suzuki et al. | |

* cited by examiner

*Primary Examiner*—Christopher P. Ellis
*Assistant Examiner*—Brian Swenson
(74) *Attorney, Agent, or Firm*—Michael Best & Friedrich LLP

(57) ABSTRACT

A vehicle or equipment having a frame, a plurality of wheels, and an engine coupled to the frame. The engine includes a shaft. The vehicle or machine further comprising a first driving member coaxially coupled with the shaft, a first driven member driven in response to the first driving member, a transmission interconnecting the first driven member and at least one of the wheels, a second driving member coaxially coupled with the shaft, a second driven member driven in response to the second driving member, auxiliary equipment operable in response to the second driven member, and an alternator. The alternator includes a stator comprising a core and conductors disposed on the core, and a rotor coaxially coupled with the shaft. The rotor is operable to interact with the stator to produce electrical energy in the conductors.

65 Claims, 5 Drawing Sheets

VEHICLE OR LAWN AND GARDEN MAINTENANCE EQUIPMENT HAVING A GENERATOR, AND POWER TAKEOFF ASSEMBLY FOR A VEHICLE OR LAWN AND GARDEN MAINTENANCE EQUIPMENT

FIELD OF THE INVENTION

The invention relates to a vehicle or lawn and garden maintenance equipment having a generator, and a power takeoff assembly for a vehicle or lawn and garden maintenance equipment.

BACKGROUND

In recent years, there has been a growing demand for distributed, portable AC power largely taking the form of dedicated generators. In addition, markets have been emerging for auxiliary generators integrated into engine-powered equipment, such as a lawn and garden tractor. Various schemes have been developed for providing onboard power on a lawn and garden tractor. For example, Briggs & Stratton Corporation has designed and developed an "under-the-flywheel generator" for a lawn and garden tractor. Example constructions of the under-the-flywheel generator are disclosed in U.S. Pat. No. 6,603,227, the entire content of which is incorporated herein by reference. It would be beneficial to have a less expensive alternative for an auxiliary generator integrated into engine-powered equipment.

SUMMARY

The invention provides a vehicle or lawn and garden maintenance equipment having a frame, a plurality of wheels, and a prime mover assembly (e.g., an assembly having an engine or an assembly having a fuel cell coupled to a motor) coupled to the frame. The prime mover assembly includes a shaft having an axis. The vehicle or machine further includes a first driving member (e.g., a first pulley, gear, or sprocket) coaxially coupled with the shaft, a first driven member (e.g., a second pulley, gear, or sprocket) driven in response to the first driving member, a transmission that transmits torque from the second driven member to at least one of the wheels, a second driving member (e.g., a third pulley) coaxially coupled with the shaft, a second driven member (e.g., a fourth pulley) driven in response to the second driving member, auxiliary equipment operated in response to the second driven member, and an alternator. The alternator includes a stator comprising a core and conductors disposed on the core, and a rotor coaxially coupled with the shaft. The rotor is operable to interact with the stator to produce electrical energy in the conductors.

The invention further provides a power takeoff assembly for attachment with a shaft of an engine (or other prime mover assemblies) of a vehicle or lawn and garden maintenance equipment. The power takeoff assembly can, for example, be retrofit onto existing vehicles or lawn and garden maintenance equipment. The power takeoff assembly includes an adapter to be coupled with the shaft, a first driving member supported by the adapter to rotate with the adapter, a stator having a core and conductors disposed on the core, and a stator mount coupled to the stator. The stator mount and the stator substantially define a cavity containing the first driving member, and further defining an opening. The power takeoff assembly further includes a bearing interconnecting the stator mount and the adapter, a rotor supported by the adapter to rotate with the adapter, and a second driving member supported by the adapter to rotate with the adapter. The rotor is operable to interact with the stator to produce electrical energy in the conductors.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof, are herein meant to encompass the items listed thereafter and equivalents thereof as well as additional items. The terms "mounted," "connected," "supported," and "coupled" and variations thereof are used broadly herein and encompass both direct and indirect mountings, connections, supports, and couplings. Further, "connected" and "coupled" are not restricted to physical or mechanical connections or couplings.

Figure 1:
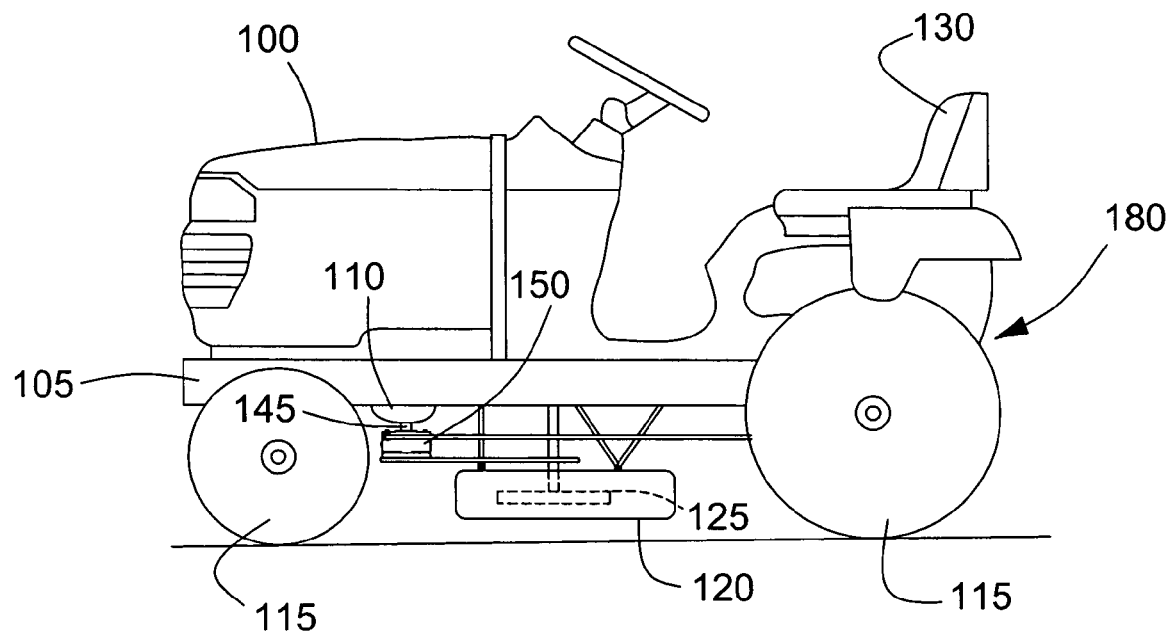
FIG. 1 is a side view of a lawn and garden tractor incorporating the invention.

FIG. 1 is a side view of a vehicle incorporating the invention. More specifically, the vehicle is shown as a lawn and garden (L&G) tractor 100 having a chassis or frame 105, an internal combustion engine 110 supported by the frame 105, a plurality of wheels 115 supporting the frame 105 and driven by the engine 110, a mower deck 120 supported by the frame 105, a cutting implement 125 (or blade) disposed under the mower deck 120 and driven by the engine 110, and a seat 130 supported by the frame 105 for an operator to sit in. The invention is not limited to the L&G tractor 100. Rather, the invention can be incorporated in other vehicles, such as all-terrain vehicles, two-wheeled vehicles, and other three and four-wheeled vehicles. Further, the invention can be incorporated in other lawn and garden maintenance equipment besides L&G tractors, such as lawn mowers and snow throwers. Moreover, while the L&G tractor 100 of FIG. 1 is shown having a mower deck 120, other auxiliary equipment can be attached to or in place of the mower deck 120. For example, a L&G tractor can include a snow thrower in place of the mower deck 120. The snow thrower includes an auger implement (shown in FIG. 8). It is also envisioned that other prime mover assemblies can be used in place of the engine 110. For example, a fuel cell coupled with a motor can be used as the prime mover assembly.

Figure 3:
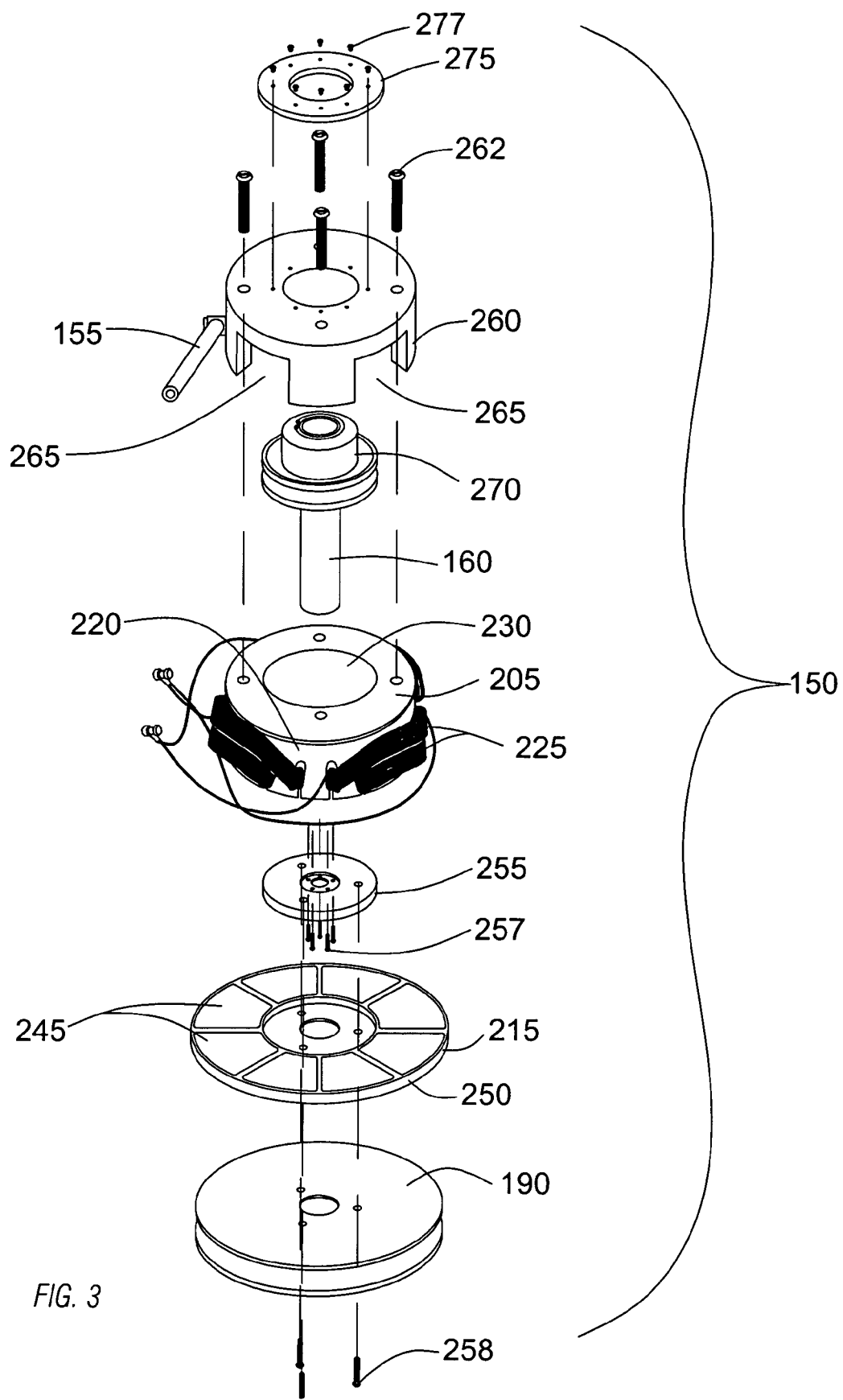
FIG. 3 is an exploded view of the power takeoff assembly of FIG. 2.

Referring again to FIG. 1, the engine 110 has a power takeoff (PTO) shaft 145, and a power takeoff assembly 150 is coupled to the PTO shaft 145 and secured to the frame 105 by a torque arm 155 (best shown in FIG. 3). Before proceeding further, it should be understood that an adapter 160 (FIG. 3) can be coupled with the PTO shaft 145 to allow the interconnection of the PTO shaft 145 and the power takeoff assembly 150. However, the PTO shaft 145 and the adapter 160 may be collectively referred to herein as the PTO shaft 145, or simply the shaft 145.

Figure 2:
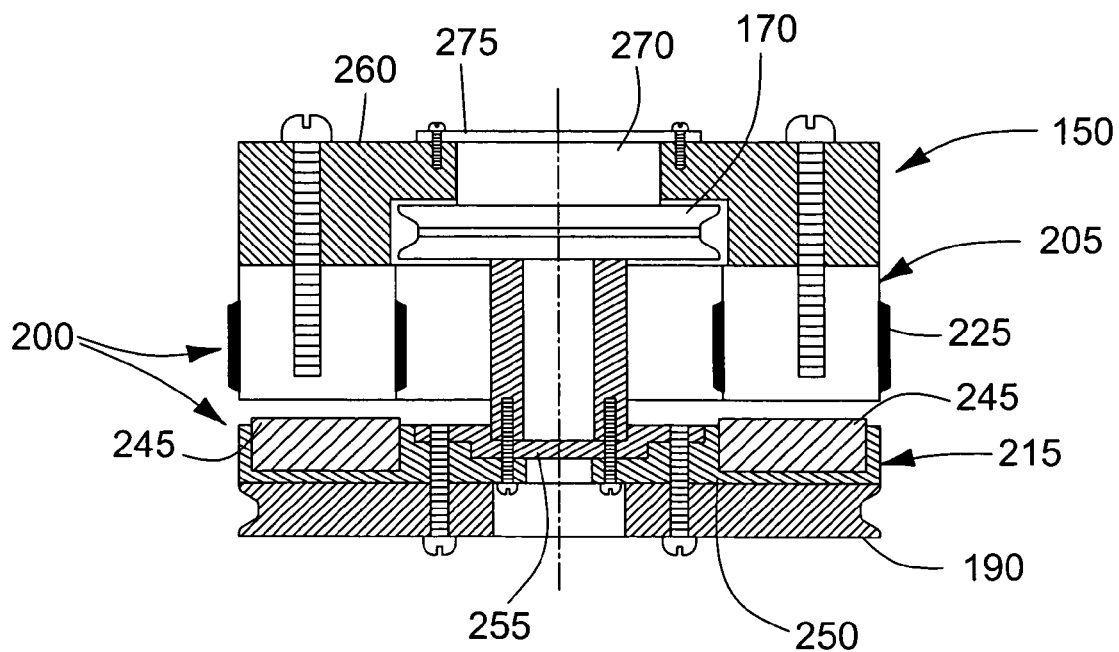
FIG. 2 is a sectional view of a power takeoff assembly adapted to be secured to the lawn and garden tractor of FIG. 1.

A sectional view of the power takeoff assembly is shown in FIG. 2 and an exploded view of the power takeoff assembly is shown in FIG. 3. With reference to FIGS. 1-3 and 7, the shaft/adapter 145/160 defines an axis of rotation. A first driving member is coaxially coupled to the shaft for rotation with the shaft. The first driving member drives a first driven member interconnected with a transmission. More specifically and for the construction shown, a first belt 165 engages first and second pulleys 170 and 175 to enable the first pulley 170 to drive the second pulley 175. The second pulley 175 is coupled to a transmission 180 to allow the transmission 180 to receive the torque transmitted by the first belt 165. In operation, the engine 110 causes the shaft 145 and the first pulley 170 to rotate. The first belt 165 engages the first and second pulleys 170 and 175 to transfer torque from the first pulley 170 to the second pulley 175. The rotation of the second pulley 175 causes the transmission 180 to transmit the rotation torque applied from the first belt 165 to the one or more wheels 115 coupled to the transmission 180.

While the construction of FIGS. 1-4 are shown with the first drive and driven members comprising a belt-and-pulley assembly, other arrangements and constructions are possible. For example, the first drive and driven members can comprise a sprocket-and-chain system or a gearing system. It should also be understood that belt-and-pulley assembly can comprise additional belts and pulleys for transferring the torque from the first pulley 170 to the second pulley 175.

Referring again to FIGS. 1-3, a second driving member is coaxially coupled to the shaft for rotation with the shaft. The second driving member drives a second driven member interconnected with the auxiliary equipment (e.g., the mower deck 120 of FIG. 1, the snow thrower 135 of FIG. 8, etc.). More specifically and for the construction shown, a second belt 185 engages third and fourth pulleys 190 and 195 to enable the third pulley 190 to drive the fourth pulley 195. The fourth pulley 195 is coupled to the auxiliary equipment to receive the torque transmitted by the second belt 185. In operation, the engine 110 causes the shaft 145 and the third pulley 190 to rotate. The second belt 185 engages the third and fourth pulleys 190 and 195 to transfer torque from the third pulley 190 to the fourth pulley 195. The torque applied to the fourth pulley 195 provides mechanical power to the auxiliary equipment.

Figure 8:
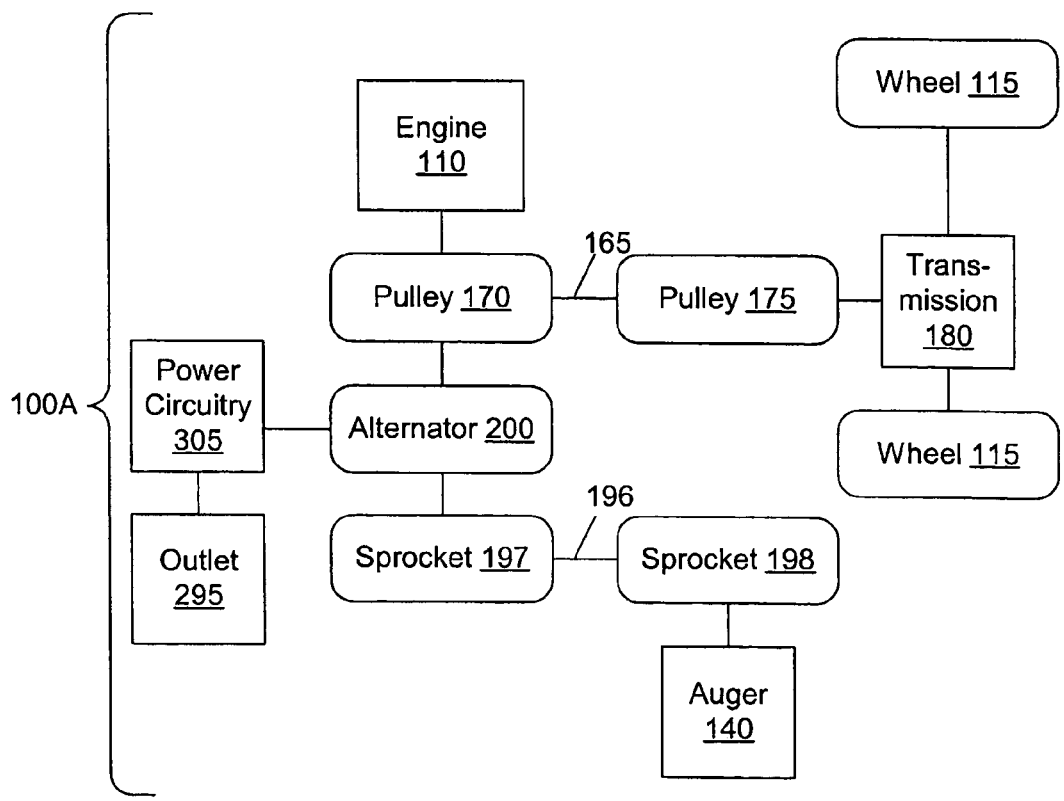
FIG. 8 is a block diagram of another construction of the lawn and garden tractor.

While the construction of FIGS. 1-4 are shown with the second drive and driven members comprising a second belt-and-pulley assembly, other arrangements and constructions are possible. For example, the second drive and driven members can comprise a sprocket-and-chain system or a gearing system. For example, FIG. 8 shows a chain 196 interconnecting first and second sprockets 197 and 198. It should also be understood that belt-and-pulley assembly could comprise additional belts and pulleys for transferring the torque from the third pulley 190 to the fourth pulley 195.

Figure 4:
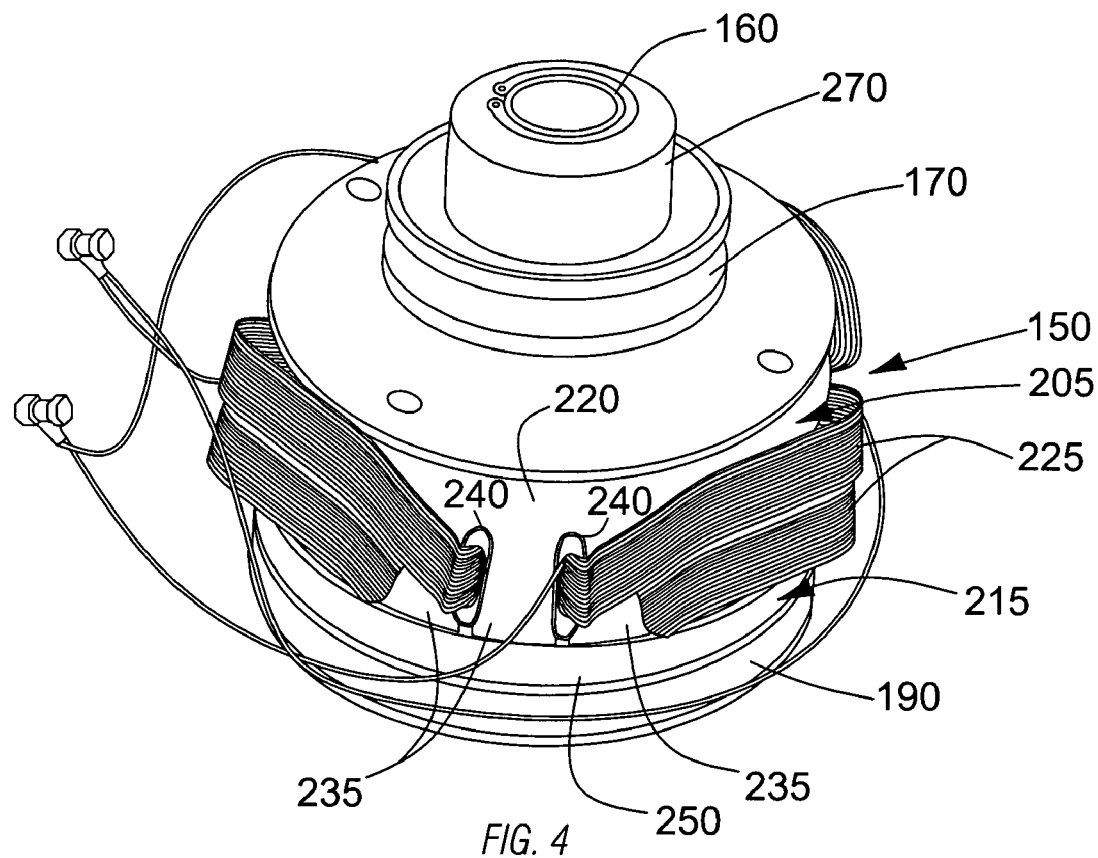
FIG. 4 is a perspective view of the power takeoff assembly of FIG. 2 without the stator mount.

With reference to FIGS. 2-4, the L&G tractor 100 further includes an alternator 200 interconnected with the shaft. The alternator 200 includes a stator 205, and a rotor 215 that magnetically interacts with the stator 205. In general, the engine 110, the alternator 200, and power circuitry (discussed below) form a generator.

For the construction shown in the figures, the stator 205 includes a magnetically permeable stator core 220, which is of generally cylindrical shape, and conductors 225 placed on the core 220. The stator core 220 is formed of stamped and spirally wound thin electrical steel. The stator core 220 includes a central opening 230 and is secured to the frame 105 such that the central opening 230 receives the adapter 160. The stator 205 is secured to the frame 105 by a plurality of fasteners (e.g., bolts and threaded apertures) coupling the stator core 220 to a stator mount (discussed below).

As best shown in FIG. 4, the stator 205 further includes a plurality of radially-extending teeth 235 and insulators 240 disposed on the teeth. The teeth 235 receive the conductors 225. For the construction shown, the conductors 225 comprise wires wound on the stator core 220 to form windings. More specifically, the stator windings are of the concentrically wound configuration and form a 4-pole stator. Other constructions of the stator and arrangements for the conductors are possible. For example, the stator core can be a solid core formed by one magnetically permeable member, can be magnetic powdered material compressed to form the stator core, or can comprise of a plurality of magnetically permeable laminations. As another example, the conductors can be of other types (e.g., wave conductors) or can form other configurations (e.g., form a three-phase winding, form a different number of poles, etc.).

Referring again to FIGS. 2-4, the alternator 200 further includes a rotor 215 coaxially aligned with the stator 205 and with the first and third pulleys 170 and 190. The rotor 215 includes a plurality of magnets 245 mounted by fasteners (e.g., an epoxy or glue) to a rotor core 250. In the construction shown, the rotor magnets 245 include eight neodymium-iron-boron (NdFeB) magnets in a four-pole configuration, and the rotor 215 and stator 220 form an axial-air gap alternator. However, other arrangements for the alternator are possible (e.g., the alternator can be a radial-air gap alternator) and other constructions for the rotor are possible (e.g., the rotor can be an exterior or outer rotor and include different magnets in different configurations).

For the construction shown in the figures, the rotor 215 is connected to the adapter 160 via a link adapter 255. More specifically the rotor 215, link adapter 255, and adapter 160 have aligned apertures into which bolts 257 are inserted to secure the rotor to the shaft. Further, the third pulley 190, rotor 215, and link adapter 255 are connected via bolts 258. However, other fasteners can be used to secure the components. Additionally, link adapter 255 and the rotor 215 can be formed as one unitary piece, and the rotor 215 and third pulley 190 can be formed as one unitary piece.

It is also noted that the alternator 200 is disposed between the first and third pulleys 170 and 190. For other constructions, the location of the alternator 200 may vary with respect to the first and third pulleys 170 and 190.

Referring to FIGS. 3 and 4, the stator 205 is secured to the frame 105 by a stator mount 260 and a torque arm 155. The stator core 220 is coupled to the stator mount 260 by a plurality of fasteners 262. The stator mount 260 and the stator 205 define a cavity that contains the first pulley 170. The stator mount 260 includes one or more passageways or channels 265 through which first belt 165 extends, thereby interconnecting the first and second pulleys 170 and 175. The stator mount 260 may also include a second cavity for housing a bearing 270. A bearing retainer 275 and fasteners 277 may be used to retain the bearing 270 in the second cavity.

The torque arm 155 secures the stator mount 260, and consequently the stator 205, to the frame 105. The bearing 270 is disposed between the stator mount 260 and the adapter 160 allowing the adapter 160 to rotate with respect to the stator mount 260 and to the stator 205. Accordingly, the stator 205 is fixed with respect to the frame 105, and the rotor 215 and first and third pulleys 170 and 190 rotate as the engine 110 rotates the shaft.

Before proceeding further, it is noted that other arrangements can be used for fixing the stator 205 to the frame 105. For example, it is conceivable for the torque arm 155 to be directly coupled to the stator 205. Additionally, other configurations of the stator mount are possible (e.g., the stator mount 260 can include a different number of channels than the two shown), and the stator mount 260 and the stator core 205 can be formed as one unitary piece.

Figure 5:
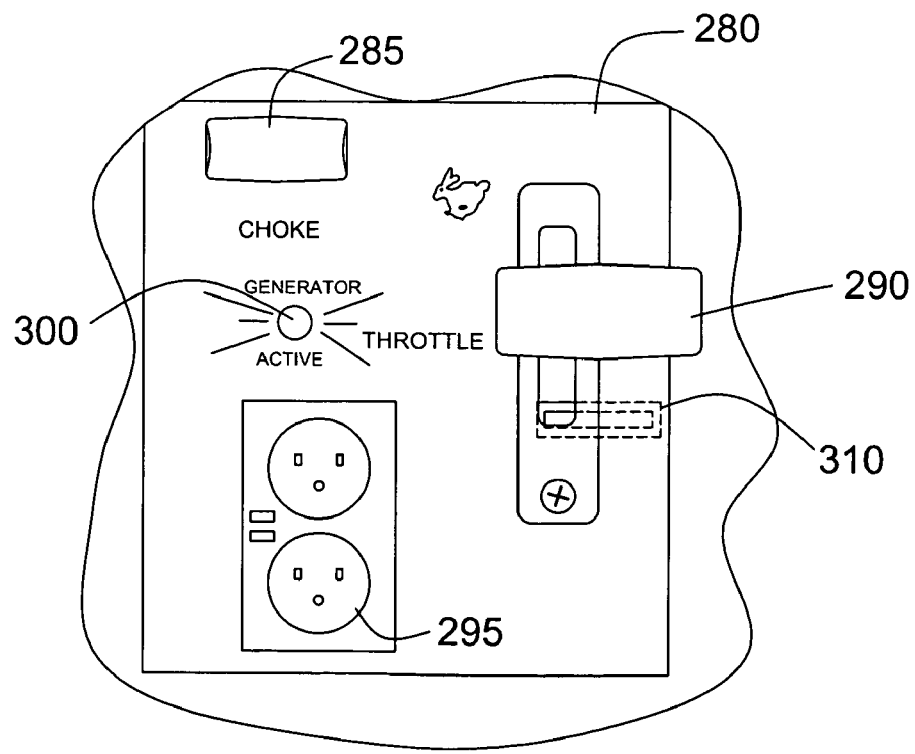
FIG. 5 is a partial side view of an operator's control panel of the lawn and garden tractor of FIG. 1.

FIG. 5 provides a partial side view of an operator's control panel 280 of the lawn and garden tractor 100. As shown in FIG. 5, the control panel 280 includes a fuel-enrichment control (a choke 285 is shown), a throttle control 290, an electrical outlet 295, and a light 300 (or other indicator) indicating that the generator is active. As will be discussed in more detail below, when the throttle control 290 is in the idle position, electric energy is provided to the electrical outlet 295.

Figure 6:
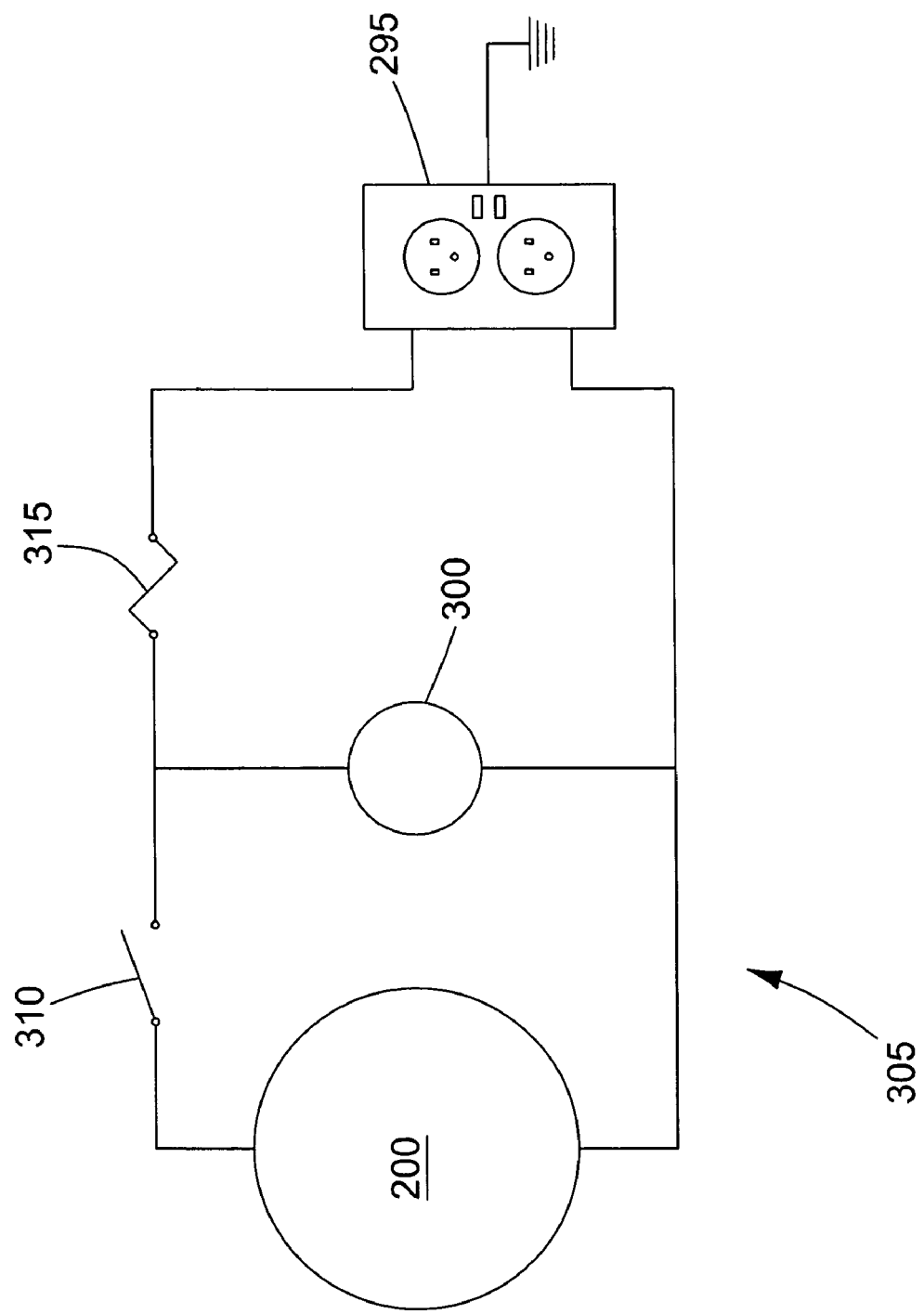
FIG. 6 is a circuit diagram of the generator used in the lawn and garden tractor of FIG. 1.
Figure 7:
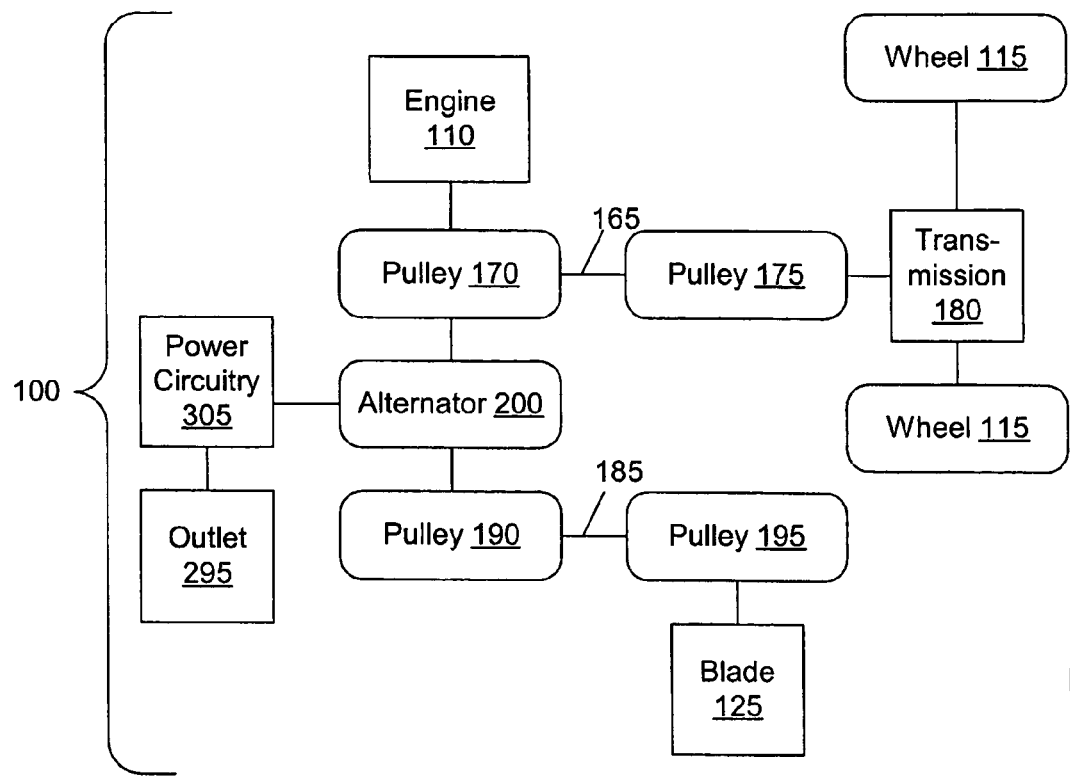
FIG. 7 is a block diagram of the lawn and garden tractor of FIG. 1.

FIG. 6 provides a circuit diagram of the power circuitry 305 of the generator. The power circuitry 305 is electrically connected to the alternator 200 and includes a microswitch 310, the light 300, a fuse 315, and the electrical outlet 295. The microswitch 310 is used to enable/disable the generator. For example, the switch 310 may be calibrated to enable the generator whenever the engine speed is approximately 1900 RPM or less. Of course, other engine threshold speeds are possible. A console-mounted 120 VAC indicator light 300 is also controlled by the microswitch 310 and illuminates whenever the generator is active. For the construction shown, no limit switch is needed for a low end RPM. Rather, a calibrated throttle stop is used such that the speed does not drop below approximately 1700 RPM. Again, other engine speeds are possible. Alternately, a lower limit switch can be used in place of the throttle stop. As a result, when the engine speed is between 1700 RPM and 1900 RPM, the generator provides an alternating current having a frequency between 57 and 63 Hz. In other constructions, the limit switches can be set for other engine speeds, thereby resulting in different frequencies (e.g., 50 Hz.).

Before proceeding further, it is noted that other power circuitry designs are possible. For example, the power circuitry can include a regulator to rectify and regulate the alternating current produced by the alternator, and an inverter to controllably switch the regulated current to produce an alternating current. A specific example of power circuitry that includes a regulator and inverter is shown in FIGS. 12-18 of U.S. Pat. No. 6,603,227, the entire contents of which are incorporated herein by reference.

In operation, when an operator starts the L&G tractor 100, the engine 110 causes the shaft 145 to rotate, and consequently, the rotor 215 and the first and second pulleys 170 and 190 rotate with the shaft 145. The operator then controls the tension of the first belt 165 for driving the second pulley 190, controls the tension of the second belt 185 for driving the fourth pulley 195, and/or activates the generator. The controlling of the tension for the first and/or second belts 165 and/or 185 can be accomplished as is well known in the art. For example, tension apparatus can be used to adjust the tension of the first and second belts 165 and 185 to controllably drive the second and fourth pulleys 190 and 195, respectively. The operator activates the generator by placing the throttle control 290 in the idle position. For the shown alternator 200, the alternator 200 is a four-pole design, and therefore, the idle speed can be adjusted such that the engine runs at approximately 1800 RPM (e.g., 1700 to 1900 RPM) while the generator is enabled. The use of the direct-drive, 60 Hz, synchronous generator shown in the figures eliminates the need for an inverter unit, resulting in significant cost savings.

For the construction shown, the generator is interconnected with a L&G tractor. Additionally, it is envisioned that the generator can be easily retrofit on existing L&G tractors since the shown alternator 200 fits within the height typically allocated for the standard PTO shaft pulleys. That is, the alternator 200 conveniently fits between the upper (or traction) pulley 170 and the lower (or auxiliary) pulley 190 of a typical L&G tractor. The axial air gap design of the shown alternator 200 allows both the rotor 215 and stator 205 to fit between the pulleys 170 and 190. Also, generally, radial clearance is either not of concern or is adequate to obtain with the axial air gap design of the alternator 200. In addition to replacing the standard PTO shaft pulleys with the power take off assembly 150, the ground fault circuit interrupter (GFCI) outlet 295 and fuse 315 and the microswitch 310 can be retrofit to an L&G tractor.

Accordingly, the invention provides a new and useful vehicle or lawn and garden maintenance equipment having a generator, and a new and useful power takeoff assembly for a vehicle or lawn and garden maintenance equipment. Various features and advantages of the invention are set forth in the following claims.

What is claimed is:

1. A vehicle comprising:
   a frame;
   a plurality of wheels;
   a prime mover assembly coupled to the frame, the prime mover assembly comprising a shaft having an axis;
   a first driving member coaxially coupled with the shaft;
   a first driven member driven in response to the first driving member;
   a transmission that transmits power from the first driven member to at least one of the wheels;
   a second driving member coaxially coupled with the shaft;
   a second driven member driven in response to the second driving member,
   auxiliary equipment operable in response to the second driven member;
   a stator coupled to the frame, the stator comprising a core and conductors disposed on the core; and
   a rotor coaxially coupled with the shaft, the rotor being operable to interact with the stator to produce electrical energy in the conductors.

2. A vehicle as set forth in claim 1 wherein the vehicle comprises lawn and garden maintenance equipment and the auxiliary equipment comprises a mowing system comprising a cutting implement, and wherein the driving of the second driven member by the second driving member results in the second driven member moving the cutting implement.

3. A vehicle as set forth in claim 1 wherein the vehicle comprises a lawn and garden tractor.

4. A vehicle as set forth in claim 1 wherein the vehicle comprises a riding lawn mower.

5. A vehicle as set forth in claim 1 wherein the vehicle comprises a lawn and garden maintenance equipment and the auxiliary equipment comprises a snow thrower comprising an auger implement, and wherein the driving of the second driven member by the second driving member results in the second driven member moving the auger implement.

6. A vehicle as set forth in claim 1 and further comprising power circuitry electrically connected to the conductors, the power circuitry comprising an electrical outlet and being operable to controllably provide at least a portion of the electrical energy to the electrical outlet.

7. A vehicle as set forth in claim 6 wherein the power circuitry further comprises a limit switch.

8. A vehicle as set forth in claim 1 wherein the axis is a vertical axis, and wherein the first driving member is disposed above the second driving member.

9. A vehicle as set forth in claim 1 wherein the rotor is disposed between the first and second driving members.

10. A vehicle as set forth in claim 9 wherein the core of the stator is disposed between the first and second driving members.

11. A vehicle as set forth in claim 10 wherein the vehicle comprises a stator mount fixedly coupled to the frame and to the stator, the stator mount and the stator substantially defining a cavity, and wherein one of the first and second driving members is substantially disposed in the cavity.

12. A vehicle as set forth in claim 11 wherein the stator mount includes a substantially planar wall and a substantially cylindrical wall, and wherein the substantially planar wall is disposed adjacent to the stator core.

13. A vehicle as set forth in claim 11 wherein the stator mount is fixedly coupled to the frame via a torque arm.

14. A vehicle as set forth in claim 11 wherein the stator mount couples to a bearing, and wherein the shaft protrudes through the bearing.

15. A vehicle as set forth in claim 1 wherein the rotor and the stator define an axial air-gap alternator.

16. A vehicle as set forth in claim 1 wherein the rotor is directly coupled to one of the first and second driving members.

17. A vehicle as set forth in claim 16 wherein the shaft has an end, and wherein the rotor is mounted to the end of the shaft.

18. A vehicle as set forth in claim 1 wherein the first driving and driven members comprise respective pulleys, and wherein a belt engages both pulleys.

19. A vehicle as set forth in claim 18 wherein the vehicle further comprises an adapter, wherein the shaft has an end, wherein the adapter is mounted to the shaft, and wherein the rotor is mounted to the adapter.

20. A vehicle as set forth in claim 1 wherein the first driving and driven members comprise respective sprockets, and wherein a chain engages both sprockets.

21. A vehicle as set forth in claim 1 wherein the first driving and driven members comprise respective gears.

22. Lawn and garden maintenance equipment comprising:
   a frame;
   a plurality of wheels;
   a prime mover assembly coupled to the frame, the prime mover assembly comprising a shaft having an axis;
   a first driving member coaxially coupled with the shaft;
   a first driven member driven in response to the first driving member;
   a transmission that transmits power from the first driven member to at least one of the wheels;
   a second driving member coaxially coupled with the shaft;
   a second driven member driven in response to the second driving member;
   auxiliary equipment operable in response to the second driven member;
   a stator comprising a core and conductors disposed on the core; and
   a rotor coaxially coupled with the shaft, the rotor being operable to interact with the stator to produce electrical energy in the conductors.

23. Lawn and garden maintenance equipment as set forth in claim 1 wherein the auxiliary equipment comprises a mowing system comprising a cutting implement, and wherein the driving of the second driven member by the second driving member results in the second driven member moving the cutting implement.

24. Lawn and garden maintenance equipment as set forth in claim 2 wherein the equipment comprises a lawn and garden tractor.

25. Lawn and garden maintenance equipment as set forth in claim 22 wherein the auxiliary equipment comprises a snow thrower comprising an auger implement, and wherein the driving of the second driven member by the second driving member results in the second driven member moving the auger implement.

26. Lawn and garden maintenance equipment as set forth in claim 22 and further comprising power circuitry electrically connected to the conductors, the power circuitry comprising an electrical outlet and being operable to controllably provide at least a portion of the electrical energy to the electrical outlet.

27. Lawn and garden maintenance equipment as set forth in claim 26 wherein the power circuitry further comprises a limit switch.

28. Lawn and garden maintenance equipment as set forth in claim 22 wherein the rotor is disposed between the first and second driving members.

29. Lawn and garden maintenance equipment as set forth in claim 28 wherein the core of the stator is disposed between the first and second driving members.

30. Lawn and garden maintenance equipment as set forth in claim 29 wherein the vehicle comprises a stator mount fixedly coupled to the frame and to the stator, the stator mount and the stator substantially defining a cavity, and wherein one of the first and second driving members is substantially disposed in the cavity.

31. Lawn and garden maintenance equipment as set forth in claim 30 wherein the stator mount includes a substantially planar wall and a substantially cylindrical wall, and wherein the substantially planar wall is disposed adjacent to the stator core.

32. Lawn and garden maintenance equipment as set forth in claim 30 wherein the stator mount is fixedly coupled to the frame via a torque arm.

33. Lawn and garden maintenance equipment as set forth in claim 30 wherein the stator mount couples to a bearing, and wherein the shaft protrudes through the bearing.

34. Lawn and garden maintenance equipment as set forth in claim 22 wherein the rotor and the stator define an axial air-gap alternator.

35. Lawn and garden maintenance equipment as set forth in claim 22 wherein the rotor is directly coupled to one of the first and second driving members.

36. Lawn and garden maintenance equipment as set forth in claim 22 wherein the shaft has an end, and wherein the rotor is mounted to the end of the shaft.

37. Lawn and garden maintenance equipment as set forth in claim 22 wherein the vehicle further comprises an adapter, wherein the shaft has an end, wherein the adapter is mounted to the shaft, and wherein the rotor is mounted to the adapter.

38. Lawn and garden maintenance equipment as set forth in claim 22 wherein the first driving and driven members comprise respective pulleys, and wherein a belt interconnects the pulleys.

39. A vehicle comprising:
a frame;
a plurality of wheels;
a prime mover assembly coupled to the frame, the prime mover assembly comprising a shaft having an axis;
a first pulley coupled to the shaft for rotation with the shaft;
a transmission that drives at least one of the wheels;
a second pulley coupled to the transmission;
a first belt that engages both the first and second pulleys to transfer torque from the first pulley to the second pulley;
auxiliary equipment coupled to the frame;
a third pulley coupled to the shaft for rotation about the axis;
a fourth pulley coupled to the auxiliary equipment;
a second belt that engages both the third and fourth pulleys to transfer torque from the third pulley to the fourth pulley;
a stator comprising a core and conductors disposed on the core,
a rotor coupled to the shaft for rotation about the axis, the rotor being operable to interact with the stator to produce electrical energy in the conductors,
power circuitry electrically connected to the conductors and comprising an electrical outlet coupled to the frame, the power circuitry being operable to provide at least a portion of the electrical energy to the electrical outlet; and
a stator mount fixedly coupled to the frame and to the stator, the stator mount and the stator substantially defining a housing that houses one of the first and third pulleys, and the stator mount and the stator further defining a channel allowing the respective one of the first and second belts to extend through the channel.

40. A vehicle as set forth in claim 39 wherein the stator core is disposed between the first and third pulleys.

41. A vehicle as set forth in claim 39 wherein the rotor is disposed between the first and third pulleys.

42. A vehicle as set forth in claim 39 wherein the stator core is disposed between the first and third pulleys, and wherein the rotor is disposed between the first and third pulleys and is disposed adjacent to the stator core along the axis.

43. A vehicle as set forth in claim 42 wherein the axis is a vertical axis, and wherein the first pulley is disposed above the third pulley.

44. A vehicle as set forth in claim 43 wherein the stator mount and the stator substantially define a housing that houses the first pulley.

45. A vehicle as set forth in claim 39 wherein the first pulley is substantially disposed in the housing, and wherein the first belt extends through the channel.

46. A vehicle as set forth in claim 45 wherein the stator mount and the stator define two channels, and wherein the first belt extends through the two channels.

47. A vehicle as set forth in claim 45 wherein the rotor is directly coupled to the third pulley.

48. A vehicle as set forth in claim 47 wherein the shaft has an end, and wherein the rotor is directly coupled to the end of the shaft.

49. A vehicle as set forth in claim 47 wherein the vehicle further comprises an adapter, wherein the shaft has an end, wherein the adapter is mounted to the shaft, and wherein the rotor is mounted to the adapter.

50. A vehicle as set forth in claim 39 wherein the stator mount includes a substantially planar wall and a substantially cylindrical wall, and wherein the substantially planar wall is disposed adjacent to the stator core.

51. A vehicle as set forth in claim 39 wherein the stator mount is fixedly coupled to the frame via a torque arm.

52. A vehicle as set forth in claim 39 wherein the stator mount supports a bearing, and wherein the shaft protrudes through the bearing.

53. A power takeoff assembly for attachment to a shaft of a prime mover assembly of a vehicle or lawn and garden maintenance equipment, the power takeoff assembly comprising:
an adapter adapted to be coupled to the shaft;
a first driving member rotatable with the adapter;
a stator comprising a core and conductors disposed on the core;
a stator mount coupled to the stator, the stator mount and the stator substantially defining a cavity containing the first driving member, and the stator mount and the stator further defining an opening;
a bearing disposed between the stator mount and the adapter;
a rotor rotatable with the adapter, the rotor being operable to interact with the stator to produce electrical energy in the conductors; and
a second driving member rotatable with the adapter.

54. A power takeoff assembly as set forth in claim 53 wherein the second driving member is directly coupled to the rotor.

55. A power takeoff assembly as set forth in claim 53 wherein the second driving member is integrated with the rotor.

56. A power takeoff assembly as set forth in claim 53 wherein the vehicle or lawn and garden maintenance equipment comprises a plurality of wheels, a first driven member to receive torque for driving at least one of the plurality of wheels, auxiliary equipment, and a second driven member to receive torque for driving the auxiliary equipment, and wherein one of the first and second driving members is adapted to drive the first driven member and wherein the other of the first and second driving members is adapted to drive the second driven member.

57. A power takeoff assembly as set forth in claim 53 and further comprising power circuitry electrically connected to the conductors, the power circuitry comprising an electrical outlet and being operable to controllably provide at least a portion of the electrical energy to the electrical outlet.

58. A power takeoff assembly as set forth in claim 57 wherein the power circuitry further comprises a limit switch.

59. A power takeoff assembly as set forth in claim 53 wherein the rotor is disposed between the first and second driving members.

60. A power takeoff assembly as set forth in claim 59 wherein the core of the stator is disposed between the first and second driving members.

61. A power takeoff assembly as set forth in claim 53 wherein the stator mount includes a substantially planar wall and a substantially cylindrical wall, and wherein the substantially planar wall is disposed adjacent to the stator core.

62. A power takeoff assembly as set forth in claim 53 wherein the power takeoff assembly further comprises a torque arm coupled to the stator mount.

63. A power takeoff assembly as set forth in claim 53 wherein the rotor and the stator define an axial air-gap alternator.

64. A power takeoff assembly as set forth in claim 53 wherein the first driving member comprises a pulley.

65. A power takeoff assembly as set forth in claim 53 wherein the second driving member comprises a pulley.

* * * * *